United States Patent
Chamberlain

(10) Patent No.: US 7,991,652 B2
(45) Date of Patent: Aug. 2, 2011

(54) SYSTEM AND METHOD FOR TRACKING A PRODUCT

(75) Inventor: Charles R. Chamberlain, Arlington, VA (US)

(73) Assignee: United States Postal Service, Washington, DC (US)

( * ) Notice: Subject to any disclaimer, the term of this patent is extended or adjusted under 35 U.S.C. 154(b) by 1744 days.

(21) Appl. No.: 10/311,465

(22) PCT Filed: Apr. 1, 2002

(86) PCT No.: PCT/US02/08228
§ 371 (c)(1),
(2), (4) Date: Dec. 16, 2002

(87) PCT Pub. No.: WO02/079924
PCT Pub. Date: Oct. 10, 2002

(65) Prior Publication Data
US 2004/0024782 A1    Feb. 5, 2004

Related U.S. Application Data

(60) Provisional application No. 60/279,738, filed on Mar. 30, 2001.

(51) Int. Cl.
*G06Q 10/00* (2006.01)
(52) U.S. Cl. .................. 705/28; 705/1; 705/26
(58) Field of Classification Search .......... 705/38, 705/22, 1, 104.1, 26, 28, 27, 31, 307; 707/6; 235/375, 385, 492, 462.01
See application file for complete search history.

(56) References Cited

U.S. PATENT DOCUMENTS

| 5,521,815 | A | * | 5/1996 | Rose, Jr. .................. 705/28 |
| 5,873,069 | A | * | 2/1999 | Reuhl et al. ............... 705/20 |
| 5,978,774 | A | * | 11/1999 | Rogers et al. .............. 705/24 |
| 5,978,804 | A |   | 11/1999 | Dietzman |
| 5,987,476 | A |   | 11/1999 | Imai et al. |
| 5,991,772 | A |   | 11/1999 | Doherty et al. |
| 6,076,064 | A | * | 6/2000 | Rose, Jr. .................. 705/1 |
| 6,177,860 | B1 | * | 1/2001 | Cromer et al. ............ 340/10.1 |
| 6,611,201 | B1 | * | 8/2003 | Bishop et al. .......... 340/426.21 |
| 6,757,663 | B1 | * | 6/2004 | Rogers et al. .............. 705/24 |
| 6,850,902 | B1 | * | 2/2005 | Finch ........................ 705/28 |
| 6,871,200 | B2 | * | 3/2005 | MacQueen et al. ........... 707/6 |
| 6,898,493 | B2 | * | 5/2005 | Ehrman et al. ............ 701/35 |
| 7,395,213 | B2 | * | 7/2008 | Kinugawa et al. .......... 705/307 |
| 7,441,710 | B2 | * | 10/2008 | Perkowski ................ 235/492 |
| 2001/0011231 | A1 | * | 8/2001 | Junger ...................... 705/23 |

(Continued)

OTHER PUBLICATIONS

Sheremata, Davis. "Big brother goes on-line: Ottawa plans computer technology to monitor every firearm sale and gun round." British Columbia Report Jul. 28, 1997: CBCA Complete, ProQuest. Web. Mar. 13, 2011.*

Judy Fahys. "Law Pulls Vehicle Records From Market." The Salt Lake Tribune Apr. 27, 2000,Business Dateline, ProQuest. Web. Mar. 13, 2011.*

(Continued)

*Primary Examiner* — Matthew S Gart
*Assistant Examiner* — Olusegun Goyea
(74) *Attorney, Agent, or Firm* — Finnegan, Henderson, Farabow, Garrett & Dunner, LLP

(57) ABSTRACT

Herein is described systems and methods for tracking a product. To track a product, product identification information that identifies the product and product ownership information is received. The product ownership information is updated when the product is transferred to another. The product identification information and product ownership information is stored in a database.

20 Claims, 4 Drawing Sheets

U.S. PATENT DOCUMENTS

| | | | | |
|---|---|---|---|---|
| 2001/0037298 | A1* | 11/2001 | Ehrman et al. | 705/40 |
| 2001/0053980 | A1* | 12/2001 | Suliman et al. | 705/1 |
| 2002/0022979 | A1* | 2/2002 | Whipp et al. | 705/5 |
| 2002/0052813 | A1* | 5/2002 | Kinugawa et al. | 705/34 |
| 2002/0128859 | A1* | 9/2002 | Perkowski | 705/1 |
| 2004/0006514 | A1* | 1/2004 | Rogers et al. | 705/24 |
| 2004/0034582 | A1* | 2/2004 | Gilliam et al. | 705/31 |
| 2005/0251458 | A1* | 11/2005 | Perkowski | 705/26 |

OTHER PUBLICATIONS

"On-line service to vehicle registration records." Bankers Research Jan. 25, 1988: Banking Information Source, ProQuest. Web. Mar. 13, 2011.*

Kenneth R. Harney. "Web Sites Offer Helpful Information to Buyers and Owners :[Final Edition]." The Washington Post Dec. 4, 1999,Business Dateline, ProQuest. Web. Mar. 13, 2011.*

* cited by examiner

SYSTEM AND METHOD FOR TRACKING A PRODUCT

CROSS-REFERENCE TO RELATED APPLICATION

This application claims the priority benefit of U.S. Provisional Application No. 60/279,738, filed on Mar. 30, 2001, which is incorporated herein by reference.

FIELD

The present invention relates generally to systems and methods for tracking a product and more particularly to systems and methods for tracking ownership of a product.

BACKGROUND

Manufacturers and retailers rely on information provided on registration cards to provide product information (e.g., recall information) to original purchasers of products. However, once an original purchaser transfers (e.g., re-sells) a product to another person, the manufacturer or retailer cannot provide product information to the new owner of the product. Accordingly, there is a need for systems and methods for tracking ownership of a product.

SUMMARY

In accordance with the invention, there is provided a method for tracking a product. Further, in accordance with the invention, there is provided a computer readable medium containing instructions for controlling a computer system to perform the method. The method comprises receiving product identification information and receiving product ownership information. The method further comprises updating the product ownership information when the product is transferred to another and storing the product identification information and product ownership information in a database.

There is further provided a system for tracking a product comprising means for receiving product identification information and means for receiving product ownership information. The system further comprises means for updating the product ownership information when the product is transferred to another and means for storing the product identification information and product ownership information in a database.

Still further, there is provided a system for tracking a product, comprising a first receiving component configured to receive product identification information and a second receiving component configured to receive product ownership information. The system further comprises an update component configured to update the product ownership information when the product is transferred to another and a storing component configured to store the product identification information and product ownership information in a database.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Figure 1:
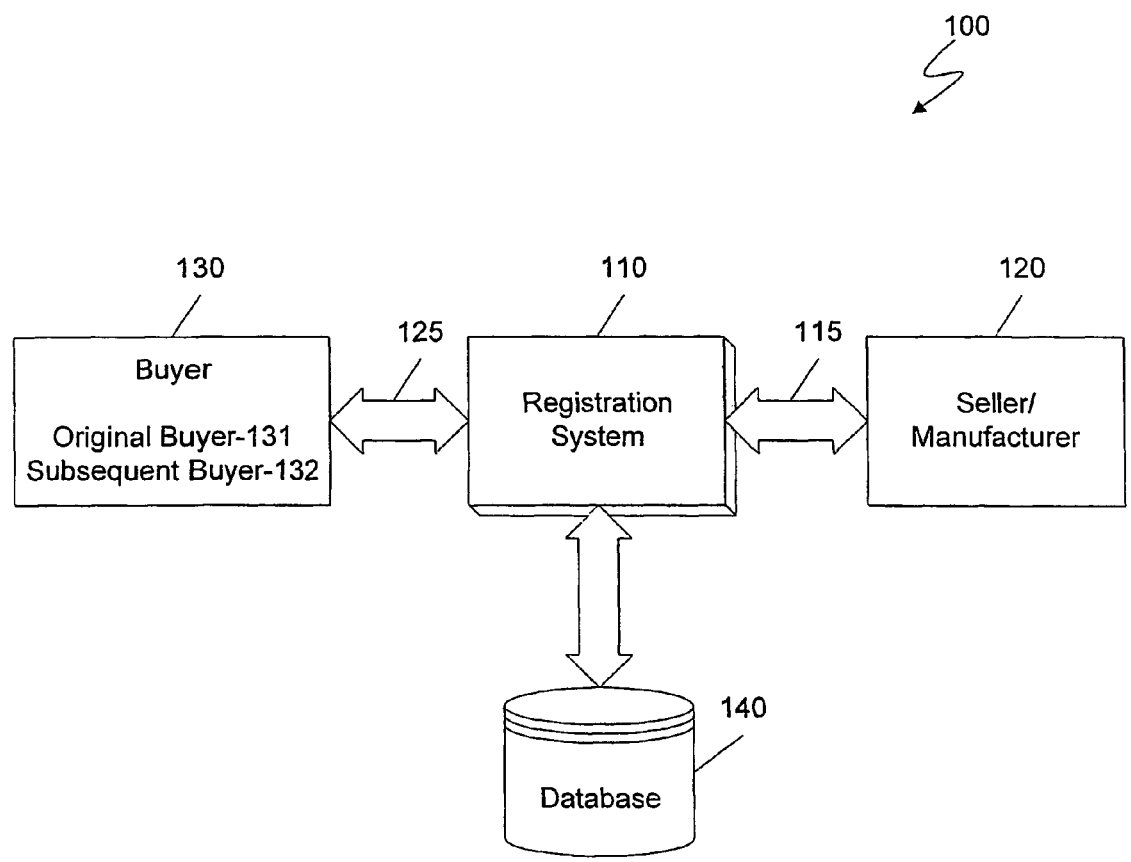
FIG. 1 illustrates an environment for tracking a product.

Referring now to the drawings, FIG. 1 illustrates an environment 100 for tracking a product. Environment 100 comprises a registration system 110, at least one seller/manufacturer 120, and at least one buyer 130.

Seller/manufacturer 120 may be any person, business (e.g. retailer), organization, transferor, manufacturer, or any other entity that sells, transfers, rents, leases, or otherwise furnishes a product to another person, business, organization, or any other entity for a fee or at no charge. In addition, seller/manufacture 120 may be a reseller, such as a person or entity, that re-sells a product at a garage sale or via an on-line auctioning service.

Buyer 130 may be any person, business, organization, or any other entity that buys, rents, leases, or otherwise receives a product for a fee or at no charge. In addition, buyer 130 may be an individual purchasing a second-hand or used product at a garage sale or via an on-line auctioning service. Buyer 130 may also be a recipient of a donated product. Buyer 130 may include original buyer 131 and/or subsequent buyers 132. A product may be any appliance, electrical device, mechanical device, painting, sculpture, hazardous material, or any other object that is sold, rented, leased, or otherwise furnished to another.

Registration system 110 may include a processor (not shown) comprising computer instructions for implementing methods consistent with the present invention. Registration system 110 and seller/manufacturer 120 may communicate via a connection 115. Registration system 110 and buyer 130 may communicate via a connection 125. Connections 115, 125 may be any system, network, or device that facilitates communication (e.g., data communication or telecommunication) using any appropriate communication protocol (e.g., TCP/IP, HTTP, HTTPS or any other security protocol, FTP, SMTP, or any other proprietary protocol). Connections 115, 125 may comprise a local area network (LAN) connection, a wide area network (WAN) connection, an Internet connection, or a combination of the foregoing. Connections 115, 125 may comprise a telephone line, optical fiber, coaxial cable, twisted wire pair, or a combination of the foregoing. Connections 115, 125 may be wireless using any technique to provide wireless transmission including infrared line of sight, cellular, microwave, satellite, packet radio, spread spectrum, or a combination of the foregoing.

To track a product, the product is registered in registration system 110. For example, once a manufacturer sells a product to a buyer, the manufacturer may communicate with registration system 110 via the Internet to register the product. Product ownership information may be updated in registration system 110 each time the product is sold, transferred, rented, leased, or otherwise furnished to another person, business, organization, or any other entity. For example, continuing with the previous example, the buyer (who later becomes the new seller) may resell the product at a garage sale to a new buyer. The new seller or the new buyer may update the product ownership information by communicating with registration system 110.

Figure 2:
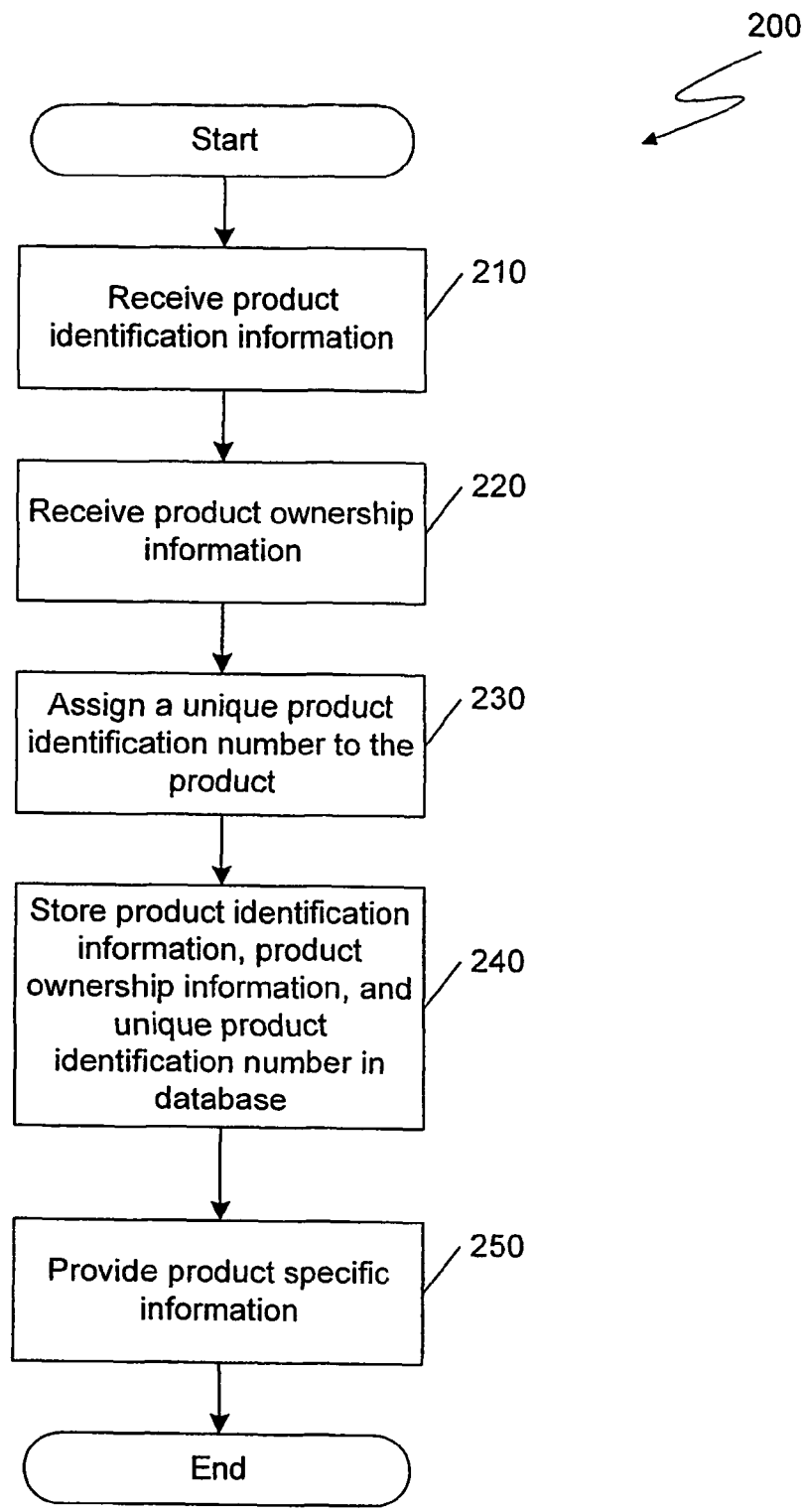
FIG. 2 illustrates one embodiment of a method for registering a product consistent with the present invention.

FIG. 2 illustrates one embodiment of a method 200 for registering the product consistent with the present invention. At stage 210, registration system 110 receives product identification information that identifies the product. Registration system 110 may receive the product identification information from seller/manufacturer 120 or buyer 130 via connection 115 or 125, respectively.

The product identification information may comprise any information that identifies the product. For example, the product identification information may comprise one or more of the following: an identification number (e.g., serial number); a product name; a product number. (e.g., model number); physical characteristics of the product (e.g., color, weight, volume, composition, description, etc.); date of transfer; date of manufacture; information on manufacturer, seller, or transferor; price information; and place of sale. Registration system 110 may provide a list of product identification information from which to select. If the product identification information of the product that is being registered is not on the list, then seller/manufacturer 120 or buyer 130 may provide the product identification information. For example, registration system 110 may provide a list of product names from which to select. If the product name of the product that is being registered is not on the list, then seller/manufacturer 120 or buyer 130 may provide the product name. The product identification information may be provided by completing a form provided via the Internet, for example.

At stage 220, registration system 110 receives product ownership information. Registration system 110 may receive the product ownership information from seller/manufacturer 120 or buyer 130. The product ownership information may include any information relating to buyer 130. For example, the product ownership information may comprise one or more of the following: buyer's 130 name; buyer's 130 mailing address and/or other contact information (e.g., telephone number, email address); and information on buyer 130 for marketing or survey purposes (e.g., age, gender, citizenship, income, occupation, marital status, ethnicity, etc.). Registration system 110 may provide a list of product ownership information from which to select. If the product ownership information of buyer 130 is not on the list, then seller/manufacturer 120 or buyer 130 may provide the product ownership information. For example, registration system 110 may provide a list of occupations from which to select. If the occupation of the buyer 130 is not on the list, then seller/manufacturer 120 or buyer 130 may provide the buyer's 130 occupation.

Preferably, each time the product is sold, transferred, rented, leased, or otherwise furnished to another person, business, organization, or any other entity (i.e., a new buyer 130), the registration system 110 receives product ownership information regarding the new buyer 130. To transfer a product includes selling, renting, leasing, granting, or other furnishing a product to another.

At stage 230, registration system 110 assigns a product identification number to the product. The product identification number may be returned to seller/manufacturer 120 and/or buyer 130. As described in greater detail below, the product identification number may be used as the product identification information to update the product ownership information when the product is transferred from original buyer 131 to subsequent buyers 132.

At stage 240, registration system 110 stores and cross-references the product identification information, product ownership information, and product identification number in a database 140.

At stage 250, registration system 110 provides product specific information to buyer 130. Registration system 110 may send product specific information to the mailing address and/or email address received at stage 220, for example. The information may be sent utilizing Electronic Postmark™ by the United States Postal Service (USPS). Also, the registration system 110 may provide product specific information to buyer 130 via the telephone based on the telephone number provided at stage 220. For example, registration system 110 may call the telephone number provided at stage 220 and play an automatic message including the product specific information.

The product specific information may comprise any information relating to the product identified by the product identification information received at stage 210. The product specific information may comprise recall information, instructions on how to use the product, product tie-in information, upgrade information, warranty information, information on previous owners, or product offers, for example. Registration system 110 may receive product specific information from the manufacturer or previous owner, for example, and store and cross-reference the product specific information in database 140.

The product specific information may be provided to buyer 130 in response to a request from buyer 130. For example, buyer 130 may request instructions on how to use the product.

Figure 3:
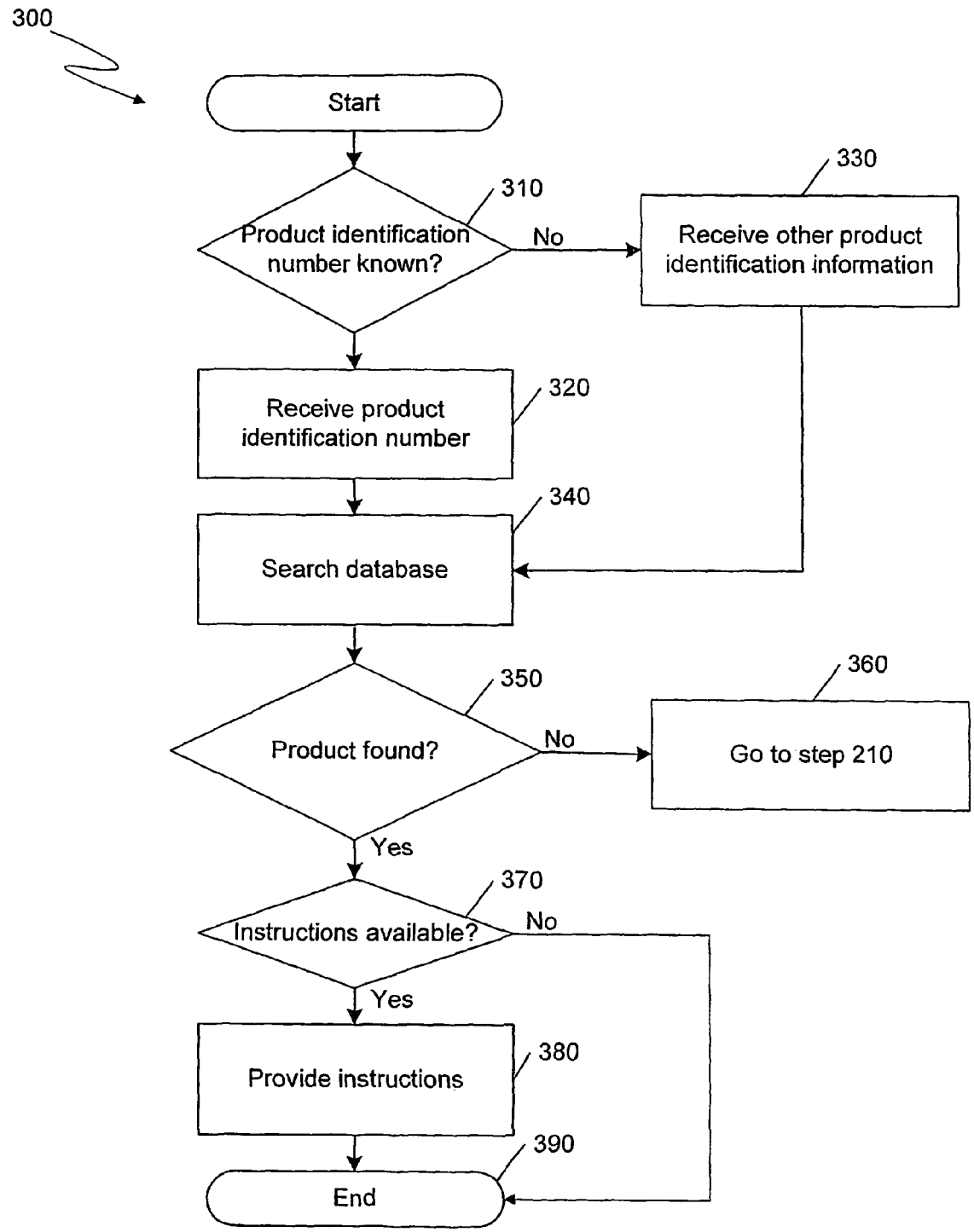
FIG. 3 illustrates one embodiment of a method for providing instructions on use to a buyer consistent with the present invention.

FIG. 3 illustrates one embodiment of a method 300 for providing instructions on how-to use the product consistent with the present invention. If the product identification number for the product is known (i.e., "Yes" at stage 310), registration system 110 receives the product identification number at stage 320. If the product identification number is not known (i.e., "No" at stage 310), registration system 110 receives other product identification information at stage 330.

At stage 340, registration system 110 searches the database 140 based on the product identification number or the other product identification information to determine the product for which instructions on use are desired. If the product is not found in database 140 (i.e., "No" at stage 350), the product may be registered at stage 360. If the product is found in database 140 (i.e., "Yes" at stage 350), registration system 110 determines whether instructions on how to use the product are available in database 140 at stage 370. If instructions are available (i.e., "Yes" at stage 370), registration system 110 provides the instructions at stage 380. For example, registration system 110 may provide instructions to subsequent buyers 132. Registration system 110 may provide the instructions or provide information on how or where to retrieve the instructions. If instructions are not available (i.e., "No" at stage 370), registration system 110 may return a message to buyer 130 stating that no instructions are available.

Figure 4:
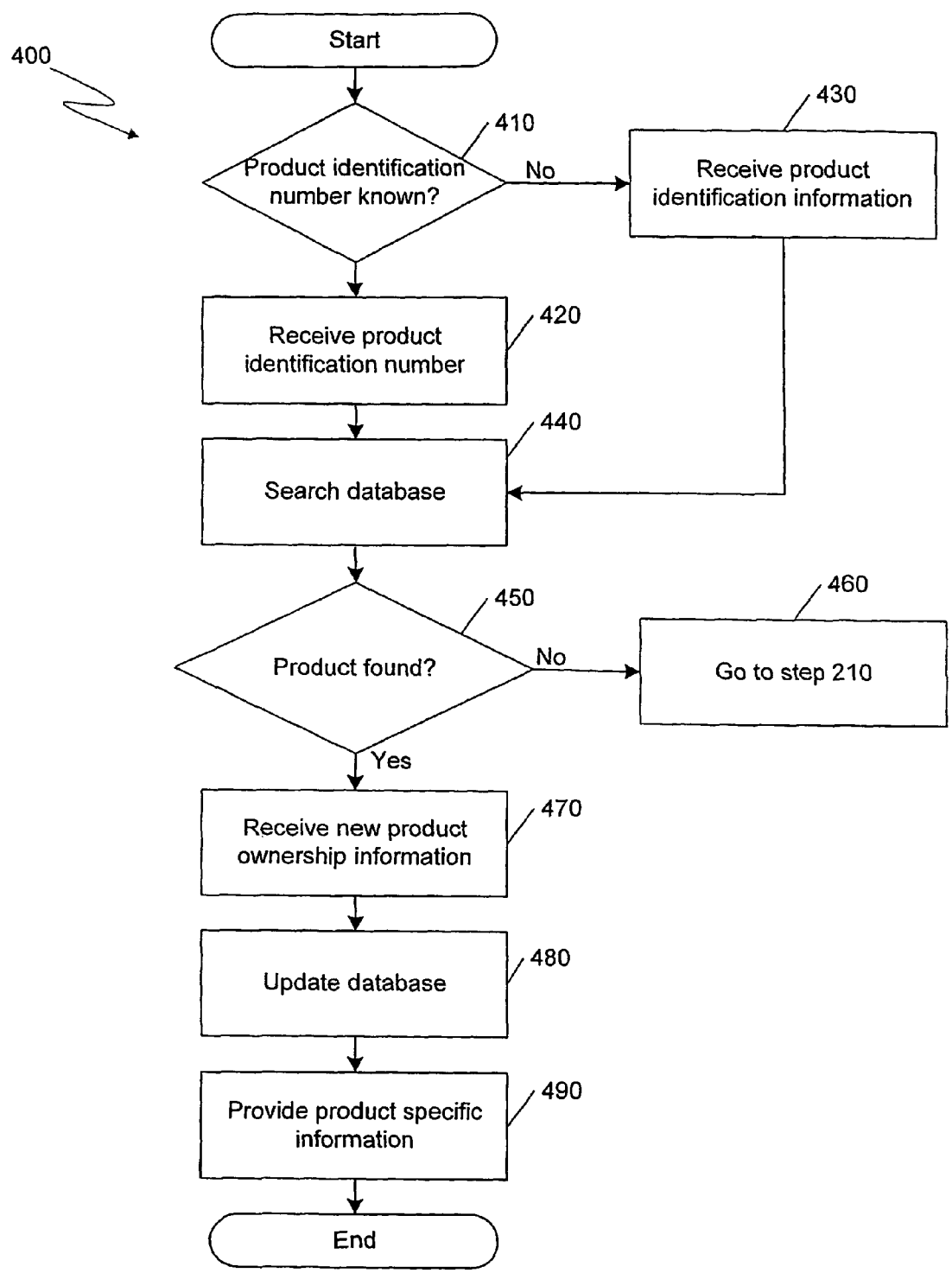
FIG. 4 illustrates one embodiment of a method for updating product ownership information in the registration system consistent with the present invention.

FIG. 4 illustrates one embodiment of a method 400 for updating the product ownership information in registration system 110 consistent with the present invention. For example, when the product is transferred from original buyer 131 to subsequent buyer 132, original buyer 131 and/or subsequent buyer 132 may communicate with registration system 110 to update the product ownership information. If the product identification number for the product is known (i.e., "Yes" at stage 410), registration system 110 receives the product identification number at stage 420. If the product identification number is not known (i.e., "No" at stage 410), registration system 110 receives other product identification information at stage 430.

At stage 440, registration system 110 searches database 140 based on the product identification number or the other product identification information to determine the product desired to be updated. If the product is not found in database 140 (i.e., "No" at stage 450), then the product may be registered at stage 460. If the product is found in database 140 (i.e., "Yes" at stage 450), then registration system 110 receives product ownership information at stage 470.

At stage 480, registration system 110 updates database 140 with the new product ownership information. Registration system 110 may update database 140 by retaining the old product ownership information and adding the new product ownership information to database 140. Alternatively, registration system 110 may update database 140 by replacing the old product ownership information with the new product ownership information.

The methods consistent with the present invention may be implemented manually, in software, firmware, hardware, or any combination thereof.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for tracking a product, comprising:
   receiving at a processor, from a manufacturer, product identification information that identifies a product, wherein the product is leased to a consumer by a third-party non-consumer after the manufacturer has sold the product to the third-party non-consumer;
   receiving, at the processor, product possession information from the leasing consumer; receiving recall information;
   storing the product identification information, product possession information, and recall information in a database connected to the processor;
   when the product is subleased, updating the product possession information;
   determining whether instructions on how to use to the product are available in the database;
   providing instructions on how to use the product based on the product possession information wherein the instructions are based on the product identification information or providing information on how or where to receive instructions; and
   outputting information, including an email address, on a previous owner based on the product possession information and based on one or more of the product identification information or product identification number.

2. The method according to claim 1, further comprising:
   assigning a product identification number to the product; and
   cross-referencing the product identification number with the product identification information and product possession information in the database.

3. The method according to claim 1, wherein the product identification information and the product possession information is received from a leasor that owns the product.

4. The method according to claim 1, wherein the product identification information and the product possession information is received from a lessee who is renting the product.

5. The method according to claim 2, wherein updating the product possession information comprises:
   receiving the product identification number;
   searching the database based on the product identification number;
   receiving new product possession information; and
   updating the database with the new product possession information.

6. A non-transitory computer readable medium containing instructions for controlling a computer system to perform a method, the method comprising:
   receiving, from a manufacturer, product identification information that identifies a product, wherein the product is leased to the consumer by a third-party non-consumer after the manufacturer has sold the product to the third-party non-consumer;
   receiving product possession information from the leasing consumer;
   receiving recall information;
   storing the recall information and product possession information in a database in relationship to the product identification information;
   when the product is subleased, updating the possession information;
   determining whether instructions on how to use to a product are available in the database;
   providing instructions on how to use the product based on the product possession information wherein the instructions are based on the product identification information or providing information on how or where to receive instructions; and
   outputting information, including an email address, on previous owners based on the product possession information and based on one or more of the product identification information or product identification number.

7. The non-transitory computer readable medium according to claim 6, the method further comprising: assigning a product identification number to the product; and
   cross-referencing the product identification number with the product identification information and product possession information in the database.

8. The non-transitory computer readable medium according to claim 6, wherein the product identification information and the product possession information is received from a leasor who owns the product.

9. The non-transitory computer readable medium according to claim 6, wherein the product identification information and the product possession information is received from a lessee who leases the product.

10. The non-transitory computer readable medium according to claim 7, wherein updating the product possession information comprises:
    receiving the product identification number;
    searching the database based on the product identification number;
    receiving new product possession information; and
    updating the database with the new product possession information.

11. A system for tracking a product, comprising:
    a processor; and
    a storage device storing instructions that are executed by the processor to perform operations comprising:
    receiving, from a manufacturer, product identification information that identifies a product, wherein the product is leased to a consumer by a third-party non-consumer after the manufacturer has sold the product to the third-party non-consumer;

receiving product possession information from the leasing consumer;

receiving recall information after receiving the product identification information;

updating the product possession information each time the product is subleased to another;

storing the product identification information, recall information, and product possession information in a database;

determining whether instructions on how to use to the product are available in the database;

providing instructions on how to use the product based on the product possession information wherein the instructions are based on the product identification information or providing information on how or where to receive instructions; and outputting information, including an email address, on previous owners based on the product possession information and based on one or more of the product identification information or product identification number.

12. The system according to claim 11, the operations further comprising:

assigning a product identification number to the product; and cross-referencing the product identification number with the product identification information and product possession information in the database.

13. The system according to claim 11, wherein the product identification information and the product possession information is received from a leasor who owns the product.

14. The system according to claim 11, wherein the product identification information and the product possession information is received from a lessee who leases the product.

15. The system according to claim 12, wherein the operation that updates the product possession information comprises:

receiving the product identification number;

searching the database based on the product identification number;

receiving new product possession information; and updating the database with the new product possession information.

16. A system for tracking a product, comprising:

a first receiving component configured to receive, from a manufacturer, product identification information that identifies a product, wherein the product is leased to the consumer by a third-party non-consumer after the manufacturer has sold the product to the third-party non-consumer, the first receiving component further configured to receive product possession information from the leasing consumer;

a second receiving component for receiving recall information after receiving the product identification information;

an update component configured to update the product possession information when the product is subleased to another;

a storing component configured to store the product identification information, recall information, and product possession information in a database;

a determining component configured to determine whether instructions on how to use to the product are available in the database;

a first providing component configured to provide instructions on how to use the product based on the product possession information wherein the instructions are based on the product identification information or providing information on how or where to receive instructions; and a second providing component configured to provide information, including an email address, on previous owners based on the product possession information and based on one or more of the product identification information or product identification number.

17. The system according to claim 16, further comprising:

an assigning component configured to assign a product identification number to the product; and a cross-referencing component configured to cross-reference the product identification number with the product identification information and product possession information in the database.

18. The system according to claim 16, wherein the product identification information and the product possession information is received from a leasor who owns the product.

19. The system according to claim 16, wherein the product identification information and the product possession information is received from a lessee who leases the product.

20. The system according to claim 17, wherein the update component is configured to:

receive the product identification number;

search the database based on the product identification number;

receive new product possession information; and update the database with the new product possession information

* * * * *